US005197765A

United States Patent [19]
Mowry, Jr. et al.

[11] Patent Number: 5,197,765
[45] Date of Patent: Mar. 30, 1993

[54] VARYING TONE SECURING DOCUMENT

[75] Inventors: William H. Mowry, Jr., Dayton, Ohio; Alan L. Sink, Rocky Mount, Va.; George W. Stubbs, Beavercreek, Ohio; John S. Simpson; John F. Kane, both of Dayton, Ohio

[73] Assignee: The Standard Register Company, Dayton, Ohio

[21] Appl. No.: 729,363

[22] Filed: Jul. 12, 1991

[51] Int. Cl.⁵ .............................................. B42D 15/00
[52] U.S. Cl. ........................................ 283/93; 283/94; 283/95; 283/902
[58] Field of Search .................. 283/93, 94, 902, 95

[56] References Cited

U.S. PATENT DOCUMENTS

| | | | |
|---|---|---|---|
| 3,675,948 | 7/1972 | Wicker | 283/93 X |
| 3,784,289 | 1/1974 | Wicker | 283/93 X |
| 4,168,088 | 9/1979 | Somlyody | 283/8 |
| 4,210,346 | 7/1980 | Mowry, Jr. et al. | 283/8 |
| 4,227,719 | 10/1980 | McElligott et al. | 283/8 |
| 4,227,720 | 10/1980 | Mowry, Jr. et al. | 283/8 |
| 4,265,469 | 5/1981 | Mowry, Jr. et al. | 283/8 |
| 4,310,180 | 1/1982 | Mowry, Jr. et al. | 283/8 |
| 4,341,404 | 7/1982 | Mowry, Jr. et al. | 283/8 |
| 4,351,547 | 9/1982 | Brooks, II | 283/8 |
| 4,360,548 | 11/1982 | Skees et al. | 428/29 |
| 4,420,175 | 12/1983 | Mowry, Jr. | 283/93 |
| 4,579,370 | 4/1986 | Corwin et al. | 283/72 |
| 4,662,651 | 5/1987 | Mowry, Jr. | 283/70 |
| 4,733,887 | 3/1988 | Mowry, Jr. | 283/58 |
| 5,018,767 | 5/1991 | Wicker | 283/94 X |
| 5,074,596 | 12/1991 | Castagnoli | 283/902 X |

FOREIGN PATENT DOCUMENTS 2217258 10/1989 United Kingdom ................ 283/93

OTHER PUBLICATIONS

Morgenstein Letter to Mr. Leonard Walle, Mar. 21, 1977.

Primary Examiner—Paul A. Bell
Attorney, Agent, or Firm—Killworth, Gottman, Hagan & Schaeff

[57] ABSTRACT

An improved security document which protects documents from copying on color copying machines. The document has cancellation terms and background pattern in two tones. If the copier is adjusted to obscure the cancellation term on reproduced copies at one tone, the cancellation at the other tone will appear. In an alternative embodiment, the density of the cancellation term and the background pattern vary across the face of the document. In this case, the cancellation term will appear somewhere on the copy no matter what copier adjustments are made.

45 Claims, 9 Drawing Sheets

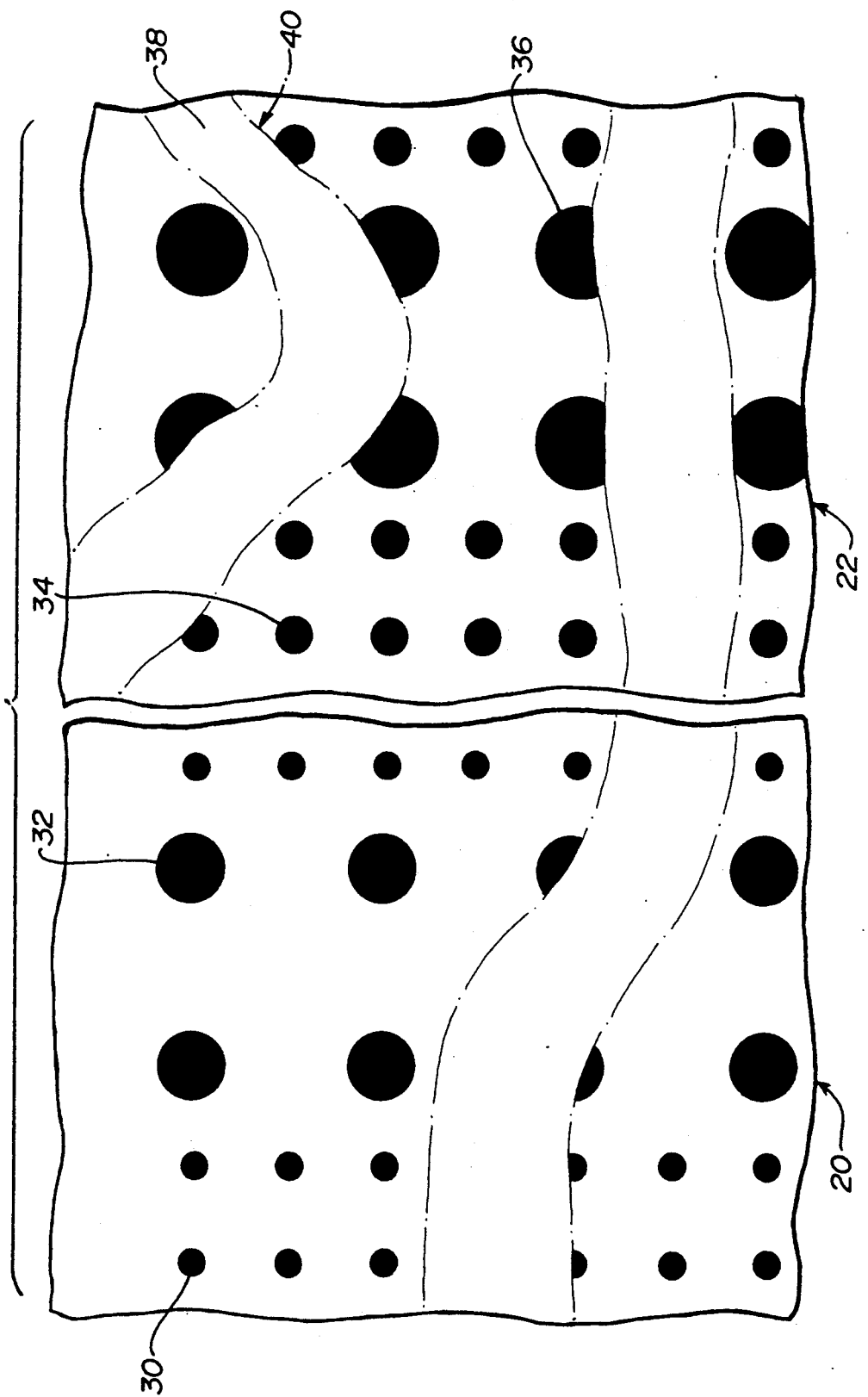

FIG-5

INTERNATIONAL CORPORATION

CHECK NO. 365770

PAY:

DOLLARS        CENTS

TO THE ORDER OF:

DATE    CHECK AMOUNT

NATIONAL BANK

⑈365770⑈ ⑆000000000⑆ 000⑈0⑈0000000⑈

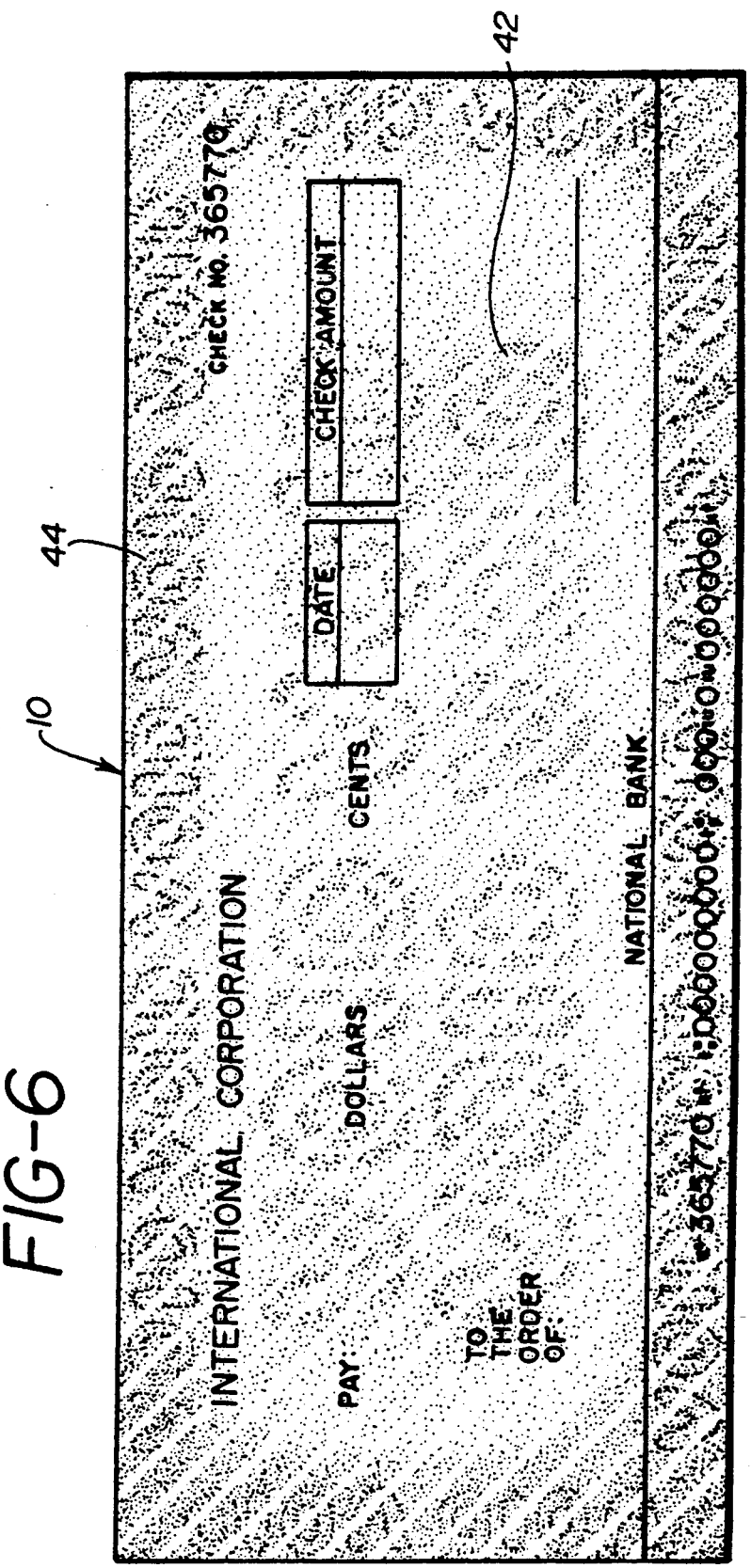

VARYING TONE SECURING DOCUMENT

BACKGROUND OF THE INVENTION

The importance of making a document safe from alteration is readily apparent. Various techniques have been used in the past to make undetected alteration of documents more difficult, including certain chemicals on the surface of the document.

The development of the color copier presented a whole new set of problems in protecting documents. The quality of color reproductions is so good that frequently it is very difficult to distinguish original copies from color reproductions. Even if the match is not exact, the reproduction often appears authentic in the absence of the original. As a consequence, there has been concern that color copiers could be used to reproduce security documents, such as checks, stock certificates, automobile title instruments, and other documents of value, for nefarious purposes. This concern has been heightened with the advent of desk top publishing software and hardware, including personal computers and scanners. Such desk top publishing systems allow sophisticated image processing and printing not previously generally available.

Many techniques have been developed to prevent improper reproduction of security documents. One of the most successful is the use of a hidden warning message which is readily apparent on reproduced copies of a document, but which is invisible, or nearly so, on the original document Examples of this technique are shown in U.S. Pat. Nos. 4,227,720 and 4,310,180. A single tone warning phrase and a single tone background pattern are used. Tone refers to the visual effect produced by solid ink coverage or by halftone dots, bars, or marks which cover a portion of a printed area and which usually have a frequency that is measured in dots, lines, or marks per inch. Halftone dots, bars, or marks may be more or less uniformly distributed over an area to produce the visual effect, i.e., less than full tone, of a lighter overall color with the use of a darker color ink printed at less than full area coverage. The warning phrase and background pattern area tones are of different frequency and are made up of dots, bars, or marks of differing size but they are selected to provide similar appearance to the eye of a casual observer. A less than full tone effect may also be produced by full area coverage of a paler color of ink than the darker color of ink used for the halftone dots, bars, or marks.

Because the tone of the warning phrase and the tone of the background pattern are selected to be the same, these two areas have much the same visual impact on an observer of the original document, and the warning phrase is not readily perceived. The optics of color copiers have typically been unable to reproduce relatively small halftone dots, lines or other elements. As a consequence, reproduced copies of the original document will have a noticeable warning phrase.

A camouflage pattern is sometimes utilized to obscure the warning phrase further. The camouflage pattern may be defined by areas in which the dots, bars, or marks have been deleted from both the warning phrase and the background pattern. The camouflage pattern may also be defined by a pattern of dots, bars, or marks which are smaller than or larger than those used in the background pattern and the warning phrase, or by areas of complete coverage of a paler ink.

In recent years, color copiers have been improved substantially. These new color copiers have made the above technique less effective in protecting documents. By manipulating the control settings on such copiers, copies can be made of such documents in which the warning phrase does not appear on reproductions when some of the most commonly used frequency and size combinations are used. Furthermore, desk top publishing systems now available in conjunction with laser printers, offer additional possibilities for unauthorized copying. Therefore, it is clear that improvements in this technique are desirable.

One such improvement is shown in U.S. Pat. No. 4,351,547, which also utilizes a single tone background and a single tone cancellation phrase. In this improved technique, the warning phrase is not defined by dots or elements of the same size and frequency. Instead, the warning phrase is defined by an alternating dot pattern which includes large dots of lower frequency than the background tone, and small dots located in exact registry with the large dots.

U.S. Pat. No. 4,579,370 represents another improvement in the use of a hidden warning phrase. The background and warning phrase are each made up of halftone dots of two pairs of dot sizes. For example, the background might be made with about 50% of 130 lines per inch, 0.005 inch diameter, and the balance of 130 lines per inch 0.006 inch diameter; the cancellation term might be made with about 50% of the dots of 65 lines per inch, 0.010 inch diameter and the balance of 65 lines per inch, 0.012 inch diameter. This provides additional protection for documents against improper copying.

These methods have generally been successful in protecting documents at most copier settings. However, by adjusting the settings for sharpness and lightness/darkness it is still possible on some copiers for a skilled individual to produce a copy in which he warning phase is not visible.

In addition, in some industries, such as banking and the postal service, the warning phrase may interfere with the use of image scanners. The same phenomenon which makes the warning phrase visible on copies makes it stand out in the image scanner.

Another problem in producing these security documents is that of quality control. Conventional quality control procedures include control targets placed in trim areas or margins around the edges of the finished documents. The control targets are read with control instruments such as densitometers. When the target is properly printed, the image is usually correct also. However, in many products using the warning phrase technique, there are no margins or trim areas to hide these targets. In addition, the camouflage patterns used to aid in concealing the warning phrase make it almost impossible to take direct densitometer readings on these products.

Therefore, there remains a need in the art for a security document which provides improved protection against copying over a wide range of copier settings, or against manipulation using desk top publishing systems. There is also a need for a security document which can be read using banking industry and postal type image scanners. Finally, there is a need for a security document which can incorporate quality control targets.

SUMMARY OF THE INVENTION

The present invention solves this need by providing a security document which has a variable tone background pattern and coordinated cancellation phase. The term tone refers to the visual effect produced by an area with halftone elements printed in one ink or an area with a solid covering of a paler ink. With this invention, attempts to adjust the copier to obscure the cancellation phrase in one area of the reproduced document result in the appearance of the cancellation phase in another area on the reproduction.

The improved security document comprises a substrate with a surface for carrying indicia. The substrate has a first background printed matter on a first part of the surface. The first background printed matter is made up of a pattern of elements of a first size and of a first frequency. The substrate also has a first cancellation term, printed on the first part of the surface, which is made up of a pattern of elements of a second size and of a second frequency. The tone of the first background printed matter substantially equals the tone of the first cancellation term.

The substrate has a second background printed matter on a second part of the surface. The second background printed matter is made up of a pattern of elements of a third size and of a third frequency. A second cancellation term is printed on the second part of the surface. The second cancellation term is made up of a pattern of elements of a fourth size and of a fourth frequency. The tone of the second background printed matter substantially equals the tone of the second cancellation term. There is also a camouflage pattern on the first and second parts of the surface to disguise the first and second cancellation terms.

The second part of the surface can form a complete or partial border around the first part, or the first part can form a complete or partial border around the second part.

In one embodiment, the elements of the second size differ in size from the elements of the first size, and the second frequency differs from the first frequency. Also, the elements of the third size differ in size from the elements of the fourth size, and the third frequency differs from the fourth frequency.

In a preferred embodiment, the elements of the second size are larger than the elements of the first size, the elements of the third size are larger than the elements of the first size, and the elements of the fourth size are larger than the elements of the third size. In addition, the second frequency is less than the first frequency, the third frequency substantially equals the first frequency, and the fourth frequency substantially equals the second frequency.

In one embodiment of the improved security document, the first and second frequencies are substantially uniform over the first part of the surface, and the third and fourth frequencies are substantially uniform over the second part of the surface. In a preferred embodiment of the improved security document, the second frequency is one half of the first frequency, and the fourth frequency is one half of the third frequency.

In an alternative embodiment, all four frequencies are different, and the elements of the second size differ in size from the elements of the first size, the elements of the third size differ in size from the elements of the fourth size.

The camouflage pattern may be defined by the absence o the elements of the first, second, third, and fourth sizes. It may also be defined by the presence of elements of a fifth size. The elements of the fifth size may be either smaller than or larger than the elements of the first size.

In another embodiment, the security document may also have an address area printed on the substrate, the address area being made up of a pattern of elements of a fifth size. It may also have an amount area made up of a pattern of elements of a sixth size. The address area and the amount area are readable by image scanners. The elements of the fifth and sixth sizes may be substantially equal to the first size. The address area and the amount area may also include the camouflage pattern.

In still another embodiment, the security document may include quality control targets printed on its surface. The quality control targets may include a high density area, a low density area, and an intermediate density area. Density is a quantitative way of describing some aspects of tone as it applies to visual phenomenon. Density measures the relative coverage of an area with ink or the like, comparing the area coverage against references having no ink or total coverage of ink. The high density area may be a warning band, the low density area may be a scanner panel, and an intermediate target may be placed in an obscure area of the form and printed without the camouflage pattern.

An alternate embodiment of the improved security document comprises a substrate having a surface for carrying indicia. The substrate contains background printed matter on the surface, which is made up of a pattern of elements of a first size and a first frequency interval. The substrate also has a cancellation term printed on the surface made up of a pattern of elements of a second size and a second frequency interval. The frequencies of the elements of the first frequency and second frequency intervals vary on the surface. The substrate may have a camouflage pattern on the surface to disguise the cancellation term.

In one embodiment, the frequencies of the elements of the first and second frequency intervals decrease from one portion to another on the surface. The elements of the first size may be larger than the elements of the second size, or vice versa.

Alternatively, the security document may comprise a substrate having a surface for carrying indicia, background printed matter on the surface made up of a pattern of elements of a first size and a first frequency, and a cancellation term printed on the surface made up of a pattern of elements of a second size and a second frequency, and in some instances a camouflage pattern on the surface to disguise the cancellation term. In this embodiment, the size of the elements of the first and second sizes varies on the surface.

In still another embodiment, both the size of the elements and their frequency varies.

DESCRIPTION OF THE DRAWINGS

FIG. 3 is an illustration of two different areas on the surface of the document, greatly enlarged;

FIG. 5 is a drawing, similar to FIG. 4, illustrating the appearance of a reproduction obtained on a color copier or desk top publishing system at different control settings;

FIG. 6 is a drawing, similar to FIG. 4, illustrating the appearance of a reproduction obtained on a color copier or desk top publishing system at other control settings;

DESCRIPTION OF THE PREFERRED EMBODIMENT

Figure 1:
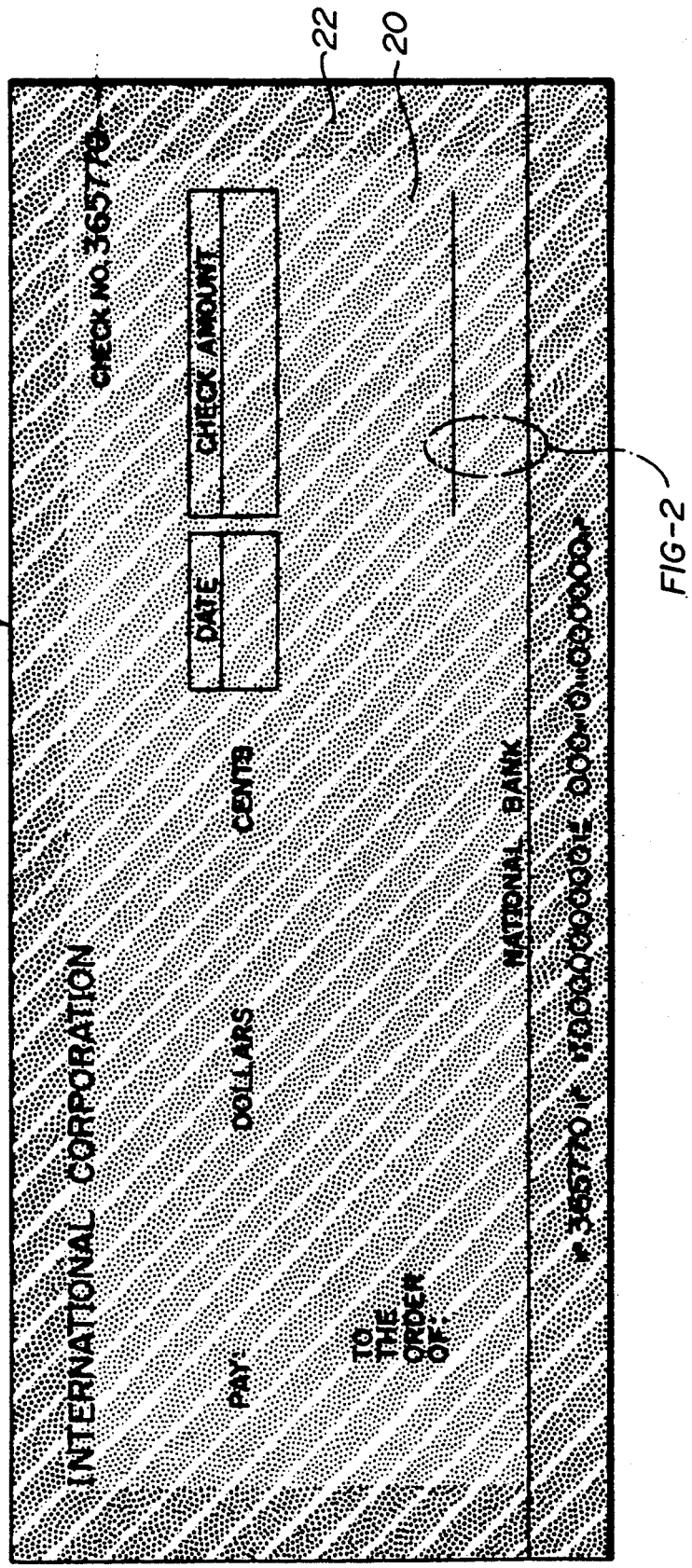
FIG. 1 illustrates a check according to the present invention as it would appear to a casual observer.

FIG. 1 illustrates a check 10 made according to the present invention, as seen by a casual observer, with a lighter tone area, first part 20, and a darker tone area, second part 22. The lighter appearance of first part 20 is due to smaller element size which results in a smaller percentage of the area of first part 20 that is covered with ink compared to second part 22. The second part 22 is shown as defining a complete border around first part 20. However, it may form only a partial border. It will be appreciated that the first part 20 may be darker than the second part 22, if desired.

Figure 2:
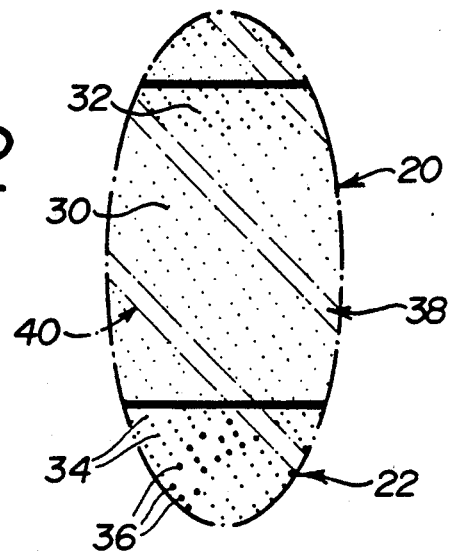
FIG. 2 is an enlarged portion of the check of FIG. 1.

FIG. 2 is a detailed illustration of a portion of check 10. FIG. 2 shows sections of first part 20 and second part 22. First part 20 contains elements of first background printed matter 30 and first warning phrase or cancellation term 32. The elements of first background matter 30 are illustrated as being smaller than those of first cancellation term 32, but they could be larger, as well.

Second part 22 has elements of second background printed matter 34 and second cancellation term 36. The elements of second background printed matter 34 are represented as being smaller than those of second cancellation term 36; alternatively, they could be larger, however. The elements of second background printed matter 34 are represented as being larger than those of first background printed matter 30, and the elements of second cancellation term 36 are shown as being larger than those of first cancellation term 32. However, they could be smaller.

The frequencies of the elements in the first and second background printed matter may be the same or they may be different. Similarly, the frequencies of the elements of the first and second background terms may be the same or different. For instance, one useful combination would be 130 lines per inch at 10% and 65 lines per inch at 15% in the first part, and 130 lines per inch at 20% and 65 lines per inch at 25% in the second part. Another useful combination might be 130 lines per inch at 10% and 65 lines per inch at 15% for the first part, and 120 lines per inch at 20% and 60 lines per inch at 25% in the second part.

Phantom dotted lines 40 do not actually appear on the check. They have been used merely to show the edges of the camouflage image 38. The camouflage image may be defined by the absence of the elements of the first and second background printed matter and first and second cancellation terms. It may also be defined by the presence of elements of a larger or smaller size than the background elements.

FIG. 3 shows an enlarged view of an area of the first part 20 and second part 22 on a different security document. The camouflage image 38 consists of wavy lines on the illustrated document. The elements of the first background printed matter 30 are smaller than the elements of first cancellation term 32. The elements of second background printed matter 34 are smaller than the elements of second cancellation term 36, but larger than the elements of first background printed matter 30. The elements of second cancellation term 36 are larger than the elements of first cancellation term 32.

The frequency of the elements of first background printed matter 30 is the same as the frequency of second background printed matter 34. The frequency of the elements of first and second cancellation terms 32 and 36 is the same, and it is less than that of first and second background printed matter 30 and 34.

The relationship between the size and frequency of the elements explains the difference in the appearance of the two parts. First part 20 appears to be lighter in tone than second part 22 because there is a lower percentage of the document surface covered with ink in relation to the total area of the document surface in first part 20; first part 20 is therefore of a lighter tone than second part 22. This is advantageous in that if a copier is adjusted to obscure or eliminate a cancellation term in first part 20 of a copy, the cancellation term in the second part 22 will appear on the reproduced copy. Similarly, if the copier is adjusted to obscure or eliminate the cancellation term in the second part 22 of the copy, the cancellation term in the first part 20 will appear on the reproduced copy.

It should be appreciated that the tone of an area of a document, that is the darkness or lightness of the document as it appears to the eye of an observer, is not a function of only density of the halftone printing elements. It is true, however, that with a halftone screen of a given number of lines per unit length, a greater density which results from larger halftone dots will produce a darker tone. It has been found, however, that an area having large, widely spaced dots will appear lighter in tone than another area having smaller, more closely spaced dots, even though the amount of document surface covered by ink per unit area is the same in each instance.

Figure 4:
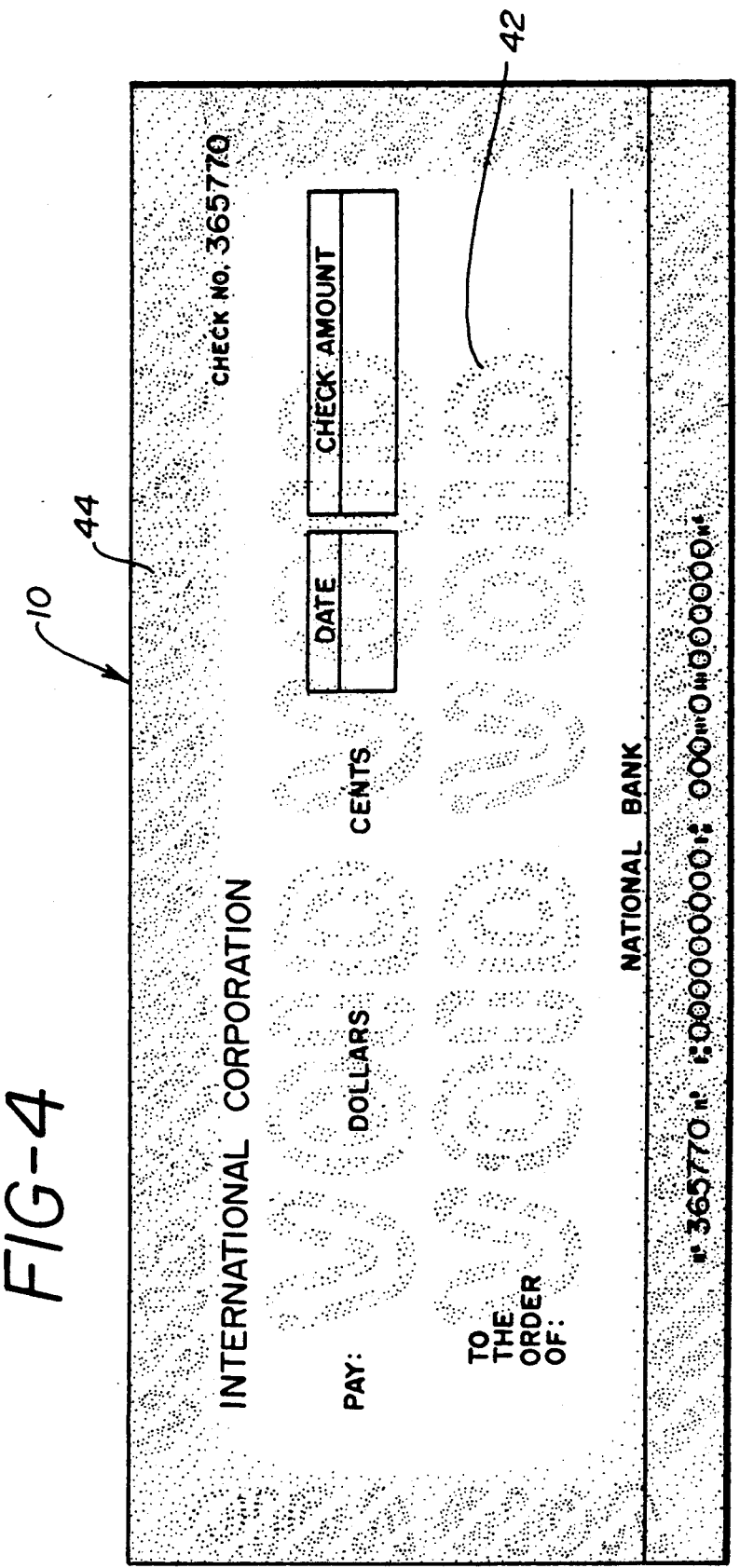
FIG. 4 illustrates the appearance of a reproduction of the document of FIG. 1 obtained on a color copier or desk top publishing system.

FIGS. 4, 5, and 6 represent the results of various attempts to copy the check 10 of FIGS. 1 and 2 on a color copier. In FIG. 4, when the copier is adjusted to obscure cancellation term 44 in second part 22, cancellation term 42 in first part 20 appears clearly on the reproduced copy.

In FIG. 5, if the copier is adjusted to lighten the copy to eliminate cancellation term 42 in first part 20, the adjustment produces a copy in which cancellation term 44 in second part 22 is clearly visible on the reproduced copy.

Finally, in FIG. 6, when the copier is adjusted to obscure cancellation term 42 in first part 20 of the reproduced copy, cancellation term 44 in second part 22 is readily apparent on the reproduced copy.

Figure 7:
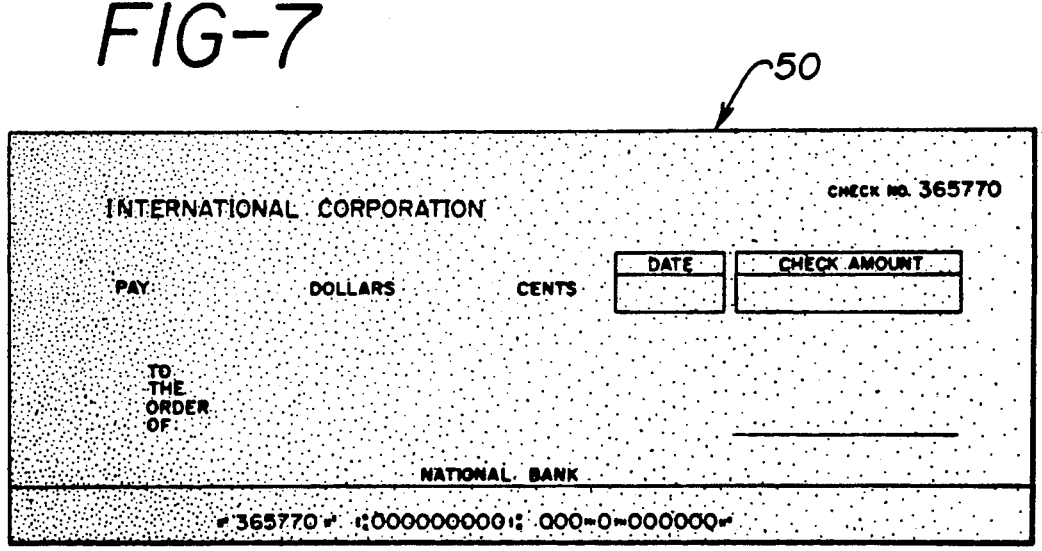
FIG. 7 is an illustration of an alternate embodiment of the present invention.

FIG. 7 shows an alternative embodiment of the present invention. The check 50 contains elements of background printed matter, elements of a cancellation term, and a camouflage pattern as illustrated above in respect to FIGS. 1–6. The tone of the elements varies across the face of the check 50. It could decrease from left to right as shown. This may be accomplished by varying the size of the halftone elements, their spacing, or both, across the face of the check 50. Other variations are possible.

Figure 8:
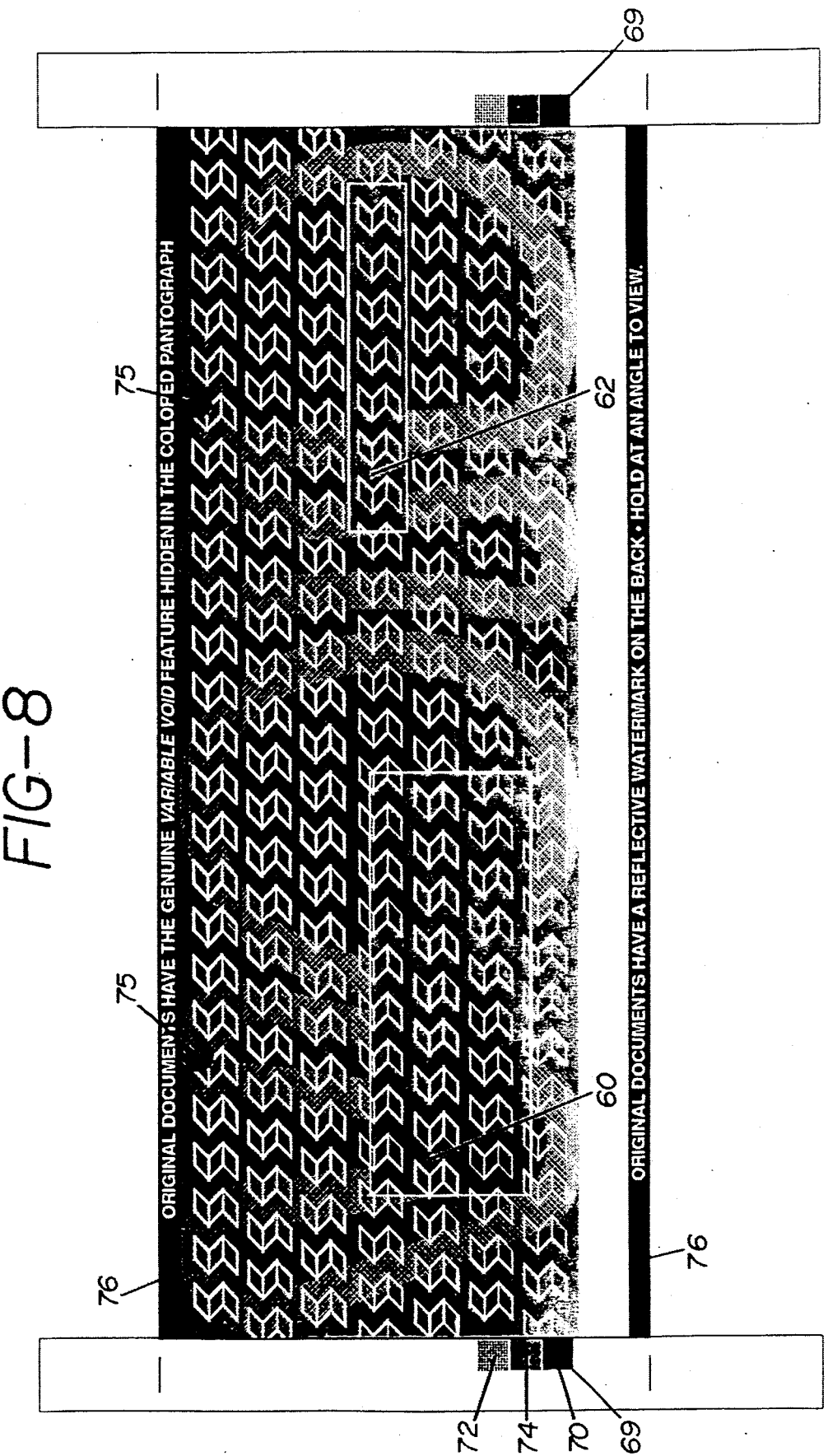
FIG. 8 is an illustration of another embodiment of the present invention.

FIG. 8 illustrates diagrammatically yet another embodiment of the present invention. In this embodiment, the frequencies of the elements of the background printed matter and the cancellation term remains the same, while the size of the elements is varied across the document. This is called a graded screen. For example, the frequency might be 130 and 65 lines per inch for the background printed matter and the cancellation term, respectively. The size of the elements of the background printed matter may vary across the document from 50% of the area covered to 5%, and the cancellation term may vary across the document from 60% to 7%. In the illustrated document, the highest percentages of coverage are at the top of the document. These percentages are gradually reduced toward the bottom of the document. The illustrated document shows this change in coverage percentages as occurring in steps, producing bands of slightly different tone. If desired, however, the size of the dots may be continuously varied over the document surface. Regardless of the manner in which the dot size of the background printed matter and the dot size of the cancellation term are varied, the selection of dot sizes for a given area on the document is made such that they provide substantially equal tone.

The address area 60 and the amount area 62 are made of halftone elements which are substantially the same spacing as the background elements. These areas may contain the camouflage pattern or it may be omitted. The address area 60 and the amount area 62 are readable by image scanners. FIG. 8 also shows a quality control target 69 printed on the surface of the check. The quality control target comprises a high density area 70, a low density area 72, and an intermediate density area 74. Warning bands 76 of high density printing may be positioned at the top and bottom of the check 50 as shown. The low density printing may be used for portions such as the address and amount areas 60 and 62. Intermediate targets 75 may be provided in obscure areas of the form and printed without the camouflage pattern.

Figure 9:
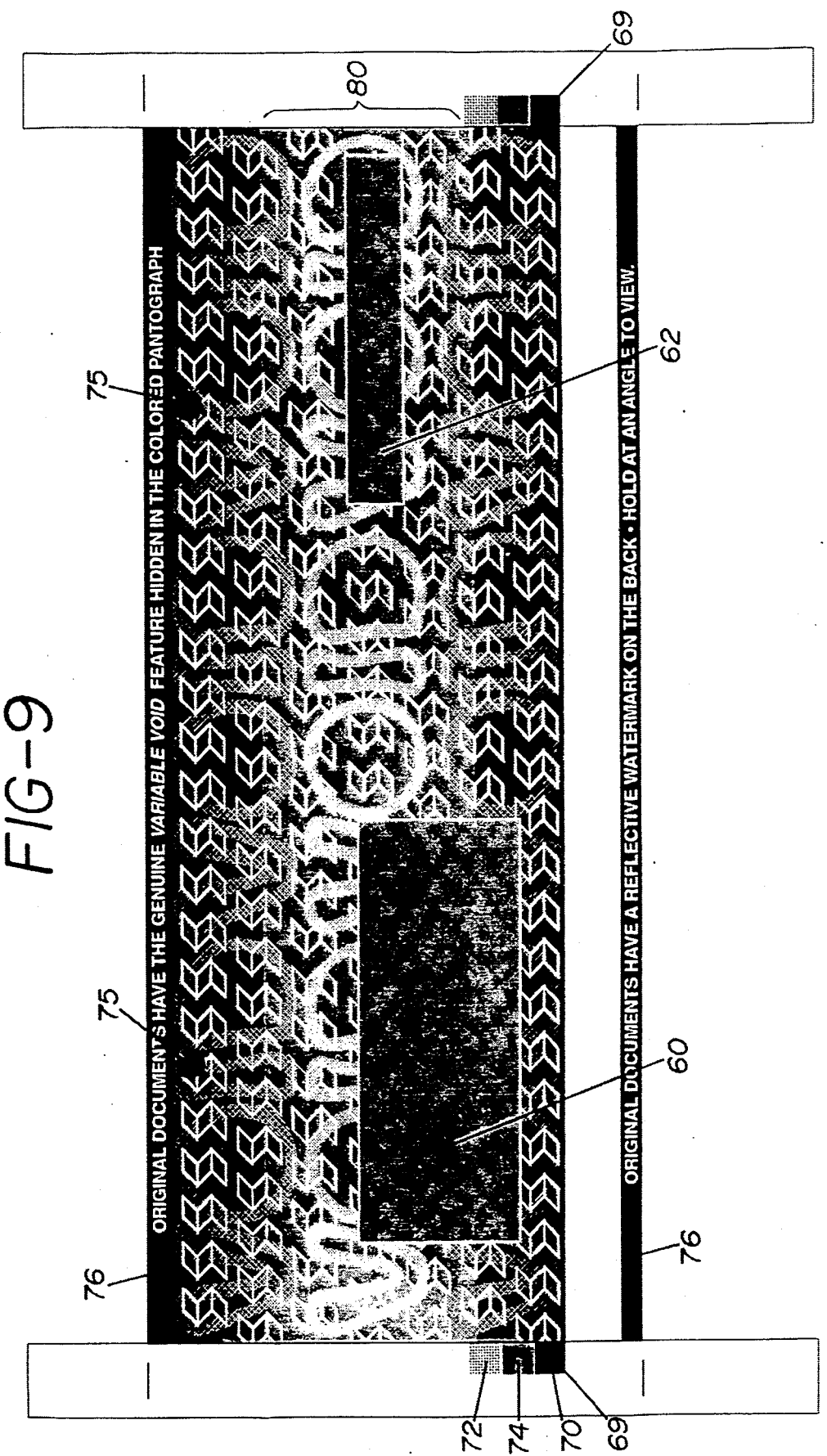
FIG. 9 is an illustration of an alternate embodiment of the present invention.

FIG. 9 illustrates diagrammatically yet another embodiment of the present invention, with parts of the document corresponding to those of FIG. 8 being labeled with like reference numerals. In the embodiment of FIG. 9, the frequencies of the elements of the background printed matter and the cancellation terms are constant, while the size of the elements is varied across the document. In contrast to the embodiment of FIG. 8, however, the highest percentages of coverage by screen elements occurs at both the top and bottom of the document. The percentages are gradually reduced toward a central band 80 of generally uniform tone. As with FIG. 8, FIG. 9 shows the changes in percentage coverage occurring in steps, producing bands of slightly different tone. If desired, however, the size of the dots may be continuously varied over the document surface. Once again, the selection of dot sizes for given areas on the document is made such that they provide substantially equal tone.

Figure 10:
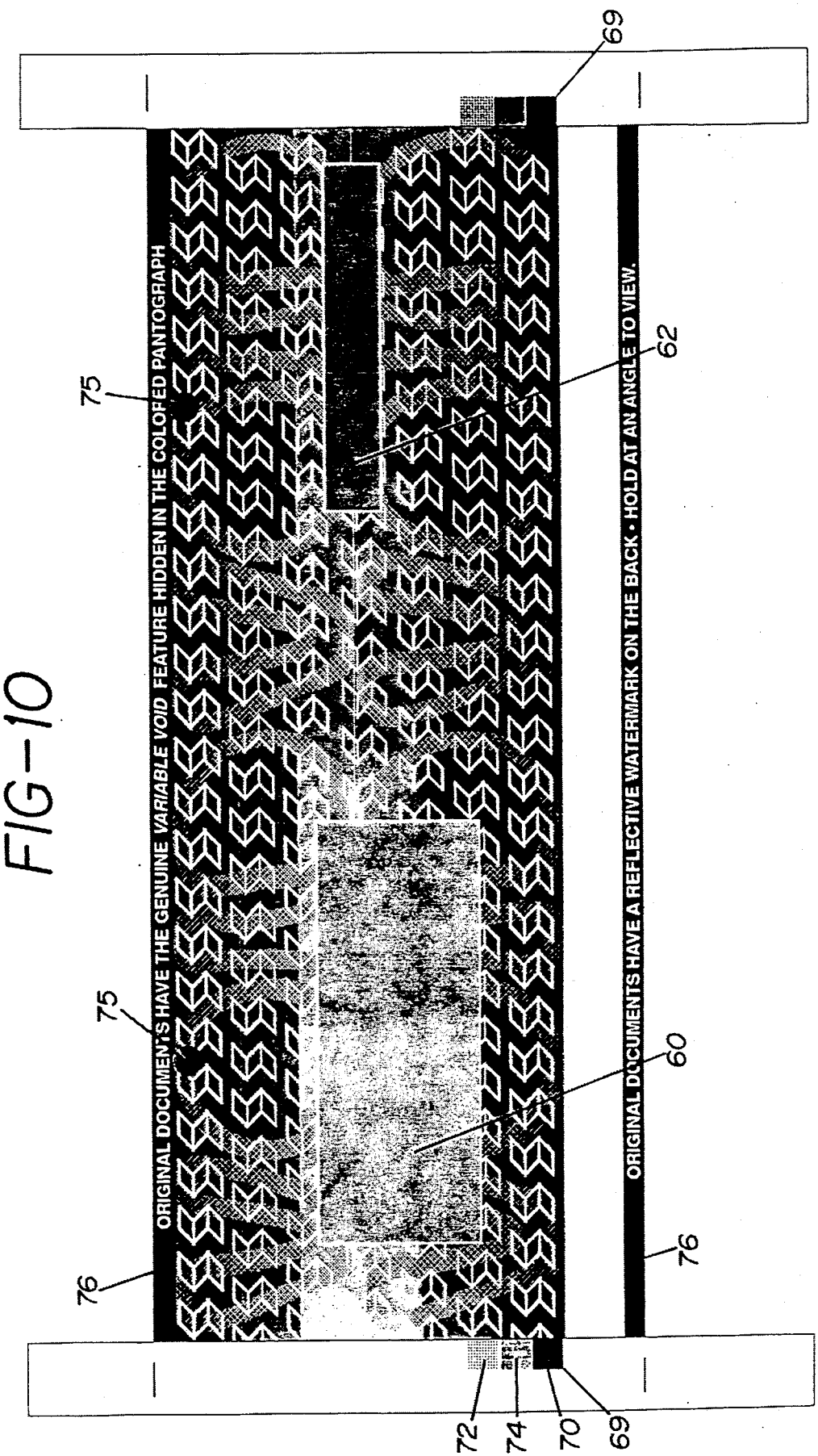
FIG. 10 is an illustration of another embodiment of the present invention.

FIG. 10 illustrates diagrammatically a further embodiment of the present invention, with parts of the document corresponding to those of FIG. 8 being labeled with like reference numerals. In the embodiment of FIG. 10, the frequencies of the elements of the background printed matter and the cancellation terms are constant, while the size of the elements is varied across the document. In contrast to the embodiment of FIG. 9, the embodiment of FIG. 10 does not include a central band of generally uniform tone. Rather the percentage of coverage by the screen elements gradually decreases from the top and bottom of the document to the middle of the document. As with the other embodiments, the selection of dot sizes is made such that the background printed matter and the adjacent portions of the cancellation terms are of substantially equal tone.

It should be understood that the phrase "cancellation term" is intended to include not only words such as the word "VOID" shown in the drawings, but also words and phrases which simply make evident to an observer that the document being inspected is a copy of the original document. Such phrases as "PHOTOCOPY", "COPY", and "DUPLICATE" may be used for this purpose. Also intended to be included within the phrase "cancellation term" are words or symbols which may signify to the individual making the copy that the original document is authentic.

Having described the improved security document of the present invention in detail and by reference to different embodiments thereof, it will be apparent that certain modifications and variations are possible without departing from the scope of the invention defined in the appended claims.

What is claimed is:

1. An improved security document, comprising:
   a substrate having a surface for carrying indicia;
   background printed matter on said surface, said background printed matter made up of a pattern of elements of a first size and a first frequency; and
   a cancellation term printed on said surface, said cancellation term made up of a pattern of elements of a second size and a second frequency, elements of one of said first size of said second size being sufficiently small such that they are not reproduced by a color copier and elements of the other of said first size of said second size being sufficiently large such that they are reproduced by a color copier, so that a copy made of said security document on a color copier displays said cancellation term, the frequencies of said elements of said first and said second frequency varying across said surface such that the tone of said background printed matter and the tone of said cancellation term vary together across said surface in a visually apparent manner, thereby impending copying said security document without said cancellation term being apparent on at least some portion of the copy.

2. The improved security document of claim 1 wherein said first and second frequencies decrease from one portion to another on said surface.

3. The improved security document of claim 1 wherein said elements of said first size are larger than said elements of said second size.

4. The improved security document of claim 1 wherein said elements of said second size are larger than said elements of said first size.

5. The improved security documents of claim 1 further including a camouflage pattern on said surface to disguise said cancellation term.

6. The improved security document of claim 1 wherein said camouflage pattern is defined by the absence of said elements of said first and second sizes in a pattern over said surface.

7. The improved security document of claim 1 wherein said camouflage pattern is defined by the presence of elements in a pattern over said surface.

8. The improved security document as in claim 1 further comprising an address area printed on said substrate, said address area made up of a pattern of elements of a third size, and an amount area printed on said substrate, said amount area made up of a pattern of elements of a fourth size, such that said address area and said amount area are readable by image scanners.

9. The improved security document as in claim 8 wherein said elements of said third and said fourth sizes are substantially equal to said first size.

10. The improved security document as in claim 8 herein said camouflage pattern is present in said address area and said amount area.

11. An improved security document, comprising:
a substrate having a surface for carrying indicia;
a first background printed matter on a first part of said surface, said first background printed matter made up of a pattern of elements of a first size and of a first frequency;
a first cancellation term printed on said first part of said surface, said first cancellation term made up of a pattern of elements of a second size and of a second frequency, the tone of said first background printed matter substantially equaling the tone of said first cancellation term;
a second background printed matter on a second part of said surface, said second background printed matter made up of a pattern of elements of a third size and of a third frequency;
a second cancellation term printed on said second part of said surface, said second cancellation term made up of a pattern of elements of a fourth size and of a fourth frequency, the tone of said second background printed matter substantially equaling the tone of said second cancellation term; and
a camouflage pattern on said first and said second parts of said surface to disguise said first and said second cancellation terms on the security document.

12. The improved security document of claim 11 wherein one of said first and second parts of said surface forms a full or partial border around the other of said first and second parts of said surface.

13. The improved security document of claim 11 wherein said elements of said second size differ in size from said elements of said first size, said second frequency differs from said first frequency, said elements of said third size differ in size from said elements of said fourth size, and said third frequency differs from said fourth frequency.

14. The improved security document of claim 13 wherein said elements of said second size are larger than said elements of said first size, said second frequency is less than said first frequency, said elements of said third size are larger than said elements of said first size, said elements of said fourth size are larger than said elements of said third size, said third frequency substantially equals said first frequency, and said fourth frequency substantially equals said second frequency.

15. The improved security document of claim 14 wherein said first frequency and said second frequency are substantially uniform over said first part of said surface, and said third and fourth frequencies are substantially uniform over said second part of said surface.

16. The improved security document of claim 15 wherein said second frequency is one half of said first frequency, and said fourth frequency is one half of said third frequency.

17. The improved security document of claim 13 wherein said first frequency differs from said third frequency and said second frequency differs from said fourth frequency.

18. The improved security document of claim 11 wherein said camouflage pattern is defined by the absence of said elements of said first, second, third, and fourth sizes from portions of said substrate surface.

19. The improved security document of claim 11 wherein said camouflage pattern is defined by the presence of elements of a fifth size on portions of said substrate surface.

20. The improved security document of claim 19 wherein said elements of said fifth size are smaller than said elements of said first size.

21. The improved security document of claim 19 wherein said elements said fifth size are larger than said elements of said first size.

22. The improved security document as in claim 11 further comprising an address area printed on said substrate, said address area made up of a pattern of elements of a fifth size, and an amount area printed on said substrate, said amount area made up of a pattern of elements of a sixth size, such that said address area and said amount area are readable by image scanners.

23. The improved security document as in claim 22 wherein said elements of said fifth and said sixth sizes are substantially equal to said first size.

24. The improved security document as in claim 22 wherein said camouflage pattern is present in said address area and said amount area.

25. The improved security document as in claim 11 further comprising a quality control target printed on the surface thereof, said quality control target comprising a high density area, a low density area, and an intermediate density area.

26. The improved security document as in claim 25 wherein said high density area is a warning band, and said low density area is a scanner panel, and said intermediate density area is printed without said camouflage pattern.

27. The improved security document of claim 11 further comprising a plurality of spaced quality control targets printed on the surface thereof, said camouflage pattern not extending over said targets.

28. An improved security document, comprising:
a substrate having a surface for carrying indicia;
background printed matter on said surface, said background printed matter made up of a patter of elements of a first size and a first frequency; and
a cancellation term printed on said surface, said cancellation term made up of a pattern of elements of a second size and a second frequency, elements of one of said first size of said second size being sufficiently small such that they are not reproduced by a color copier and elements of the other of said first size or said second size being sufficiently large such that they are reproduced by a color copier, so that a copy made of said security document on a color copier displays said cancellation term, the size of said elements of said first and second sizes varying across said surface such that the tone of said background printed matter and the tone of said cancellation term vary together across said surface in a visually apparent manner, thereby impeding copying said security document without said cancellation term being apparent on at least some portion of the copy.

29. The improved security document as in claim 28 further comprising an address area printed on said substrate, said address area made up of a pattern of elements of a third size, and an amount area printed on said substrate, said amount area made up of a pattern of elements of a fourth size, such that said address area and said amount area are readable by image scanners.

30. The improved security document of claim 29 further comprising a camouflage pattern on said surface to disguise said cancellation term.

31. The improved security document of claim 30 in which said camouflage pattern is present in said address area and said amount area.

32. The improved security document of claim 31 in which said camouflage pattern is defined by the absence of elements.

33. The improved security document of claim 28, further comprising a camouflage pattern on said surface to disguise said cancellation term.

34. The improved security document of claim 33 wherein said camouflage pattern is defined by the absence of said elements of said first and second sizes.

35. The improved security document of claim 33 wherein said camouflage pattern is defined by the presence of further elements.

36. An improved security document, comprising:
a substrate having a surface for carrying indicia;
background printed matter on said surface, said background printed matter made up of a pattern of elements of a first size and a first frequency; and
a cancellation term printed on said surface, said cancellation term made up of a pattern of elements of a second size and a second frequency, elements of one of said first size of said second size being sufficiently small such that they are not reproduced by a color copier and elements of the other of said first size or said second size being sufficiently large such that they are reproduced by a color copier, so that a copy made of said security document on a color copier displays said cancellation term, the size of said elements of said first and second size varying across said surface and the frequencies of said elements of said first and second frequency varying across said surface such that the tone of said background printed matter and the tone of said cancellation term vary together across said surface in a visually apparent manner, thereby impeding copying said security document without said cancellation term being apparent on at least some portion of the copy.

37. The improved security documents of claim 36, further comprising a camouflage pattern on said surface to disguise said cancellation term.

38. The improved security document of claim 37 wherein said camouflage pattern is defined by the absence of said elements of said first and second sizes.

39. The improved security document of claim 38 in which said further elements comprise elements of a third size.

40. The improved security document of claim 39 wherein said elements of said third size are smaller than said elements of said first size.

41. The improved security document of claim 39 wherein said elements of said third size are larger than said first size.

42. The improved security document of claim 37 wherein said camouflage pattern is defined by the presence of further elements.

43. The improved security document as in claim 36 further comprising an address area printed on said substrate, said address area made up of a pattern of elements of a third size, and an amount area printed on said substrate, said amount area made up of a pattern of elements of a fourth size, such that said address area and said amount area are readable by image scanners.

44. The improved security document as in claim 43 wherein said elements of said third and said fourth sizes are substantially equal to said first size.

45. The improved security document as in claim 43 wherein said camouflage pattern is present in said address area and said amount area.

* * * * *

UNITED STATES PATENT AND TRADEMARK OFFICE
CERTIFICATE OF CORRECTION

PATENT NO.   : 5,197,765
DATED        : March 30, 1993
INVENTOR(S)  : WILLIAM MOWRY, JR. ALAN LEON SINK, GEORGE W. STUBBS
               JOHN S. SIMPSON AND JOHN F. KANE It is certified that error appears in the above-indentified patent and that said Letters Patent is hereby corrected as shown below:

```
Column 8,  line 40  "size of said second size" should be
                    --size or said second size--.
Column 9,  Line 16  "herein said camouflage" should be
                    --wherein said camouflage--.
Column 10, Line 21  "said elements said" should be
                    --said elements of said--.
Column 10, Line 53  "made up of a patter" should be
                    --made up of a pattern--.
Column 10, Line 58  "said first size of said" should be
                    --said first size or said--.
Column 11, Line 38  "first size of said" should be
                    --first size or said--.
Column 12, Line 18  "claim 38" should be
                    --claim 42--.
```

Signed and Sealed this

Twelfth Day of July, 1994

Attest:

BRUCE LEHMAN

*Attesting Officer*     *Commissioner of Patents and Trademarks*